3,546,279
PREPARATION OF 3,3,5-TRIMETHYL CYCLO-
HEPTANOL AND ESTERS THEREOF
Jack H. Blumenthal, Oakhurst, N.J., assignor to International Flavors & Fragrances Inc., New York, N.Y., a corporation of New York
No Drawing. Filed Feb. 2, 1967, Ser. No. 613,425
Int. Cl. C07c 67/04
U.S. Cl. 260—497                                            3 Claims

ABSTRACT OF THE DISCLOSURE

This disclosure describes a process for the conversion of 5,7-dimethyl-1,6, octadiene to a lower alkanoyl ester of 3,3,5-trimethyl cycloheptanol, by cyclization of the diene with an acid such as formic or acetic acid in the presence of a strong acid catalyst, preferably at the reflux temperature of the mixture. The esters can be hydrolysed to the alcohol, which in turn can be converted to the ketone. The compounds are useful as ingredients in perfume compositions.

---

This invention relates to a novel process for the preparation of alkanoic esters of 3,3,5-trimethyl cycloheptanol, and to the preparation of the corresponding alcohol and ketone from these novel esters. It relates also to perfume compositions containing effective amounts of one or more of these valuable compounds as olfactory ingredients.

It has been discovered that the above-identified compounds have pleasing odors and other chemical and physical properties which make them suitable for imparting desirable odor characteristics to perfume compositions, soaps, detergents, cosmetics, space deodorants and the like.

The novel esters of this invention are prepared by a newly discovered cyclization process. They are converted to the alcohol by hydrolysis, and the alcohol in turn is converted to the ketone by oxidation.

In accordance with one of the process aspects of this invention, the compound 5,7-dimethyl-1,6-octadiene is reacted with a lower alkanoic acid, i.e., a carboxylic acid containing only carbon, hydrogen and oxygen up to a total of about six carbon atoms, in the presence of a strong acid catalyst, suitably an aprotic Lewis acid, a mineral acid such as sulfuric acid, an organic acid such as oxalic, trichloracetic, aromatic sulfonic acids, or sulfonated ion exchange resins such as sulfonated polystyrenes, at an elevated temperature for a period of time sufficient to produce a good yield of the desired lower alkanoyl ester of 3,3,5-tri-methyl cycloheptanol. Formic acid is a sufficiently strong organic acid so that it function sas its own catalyst for the reaction and it is specifically intended to include formic acid within the meaning of "in the presence of a strong acid catalyst."

Hydrolysis, i.e., reaction with water in aqueous alkali, more specifically in a dilute aqueous alkali metal hydroxide, such as 5% to 10% by weight aqueous sodium or potassium hydroxide is suitable for converting the ester to the alcohol. The aqueous alkali may contain a lower alkanol such as methanol or ethanol to aid in dissolving the ester. An elevated temperature, i.e., about 60° C. to 100° C. may be employed to increase the reaction rate, although hydrolysis may be effected at ambient temperature of about 25° C. to 35° C. over an extended reaction period. At the elevated temperature a reaction period of one to four hours is generally suitable. It is most convenient to carry out the reaction by refluxing over a period of one to two hours.

Oxidation of the alcohol to convert it to the ketone may be effected with any of the usual agents suitable for oxidation of secondary alcohol, e.g. aluminum isopropoxide in cyclohexanone, potassium dichromate or chromic acid. The latter reagent in acetic acid at from about 25° C. to 45° C. for from two to four hours is especially convenient.

The cyclization catalyst is employed in relatively low concentration, i.e., catalytic quantities. As little as 3% by weight based on the total weight of the composition or even less may be utilized with good results. On the other hand, useful effects may be achieved with as much as 10% or more. It is preferred to operate within this range since good yields can be obtained within convenient reaction periods without undue expense. Suitable strong mineral acids which may be used as catalysts in this reaction include sulfuric and phosphoric acids.

As used herein the term "Lewis acid" means a chemical which is an electron pair acceptor. Typical strong Lewis acids suitable for the cyclization reaction of this invention include, for example, boron trifluoride and complexes thereof such as boron trifluoride etherate, aluminum chloride and stannic chloride.

The selected reaction period and temperature may vary quite appreciably and are, of course, interdependent. They may also vary somewhat with the particular alkanoic acid employed, the catalyst and amount thereof and the presence or absence of water in the reaction mixture. It has been found that a temperature of from about 50° C. to 100° C. during a reaction period of about one to ten hours affords satisfactory yields within convenient reaction times. It is particularly convenient to effect reaction at the reflux temperature of the mixture, i.e., 90° C. to 100° C. for three to five hours.

An excess of either the diene or the alkanoic acid may be employed. Since the diene is the more expensive of the two reagents, it is preferred to use an excess of acid to insure as complete a reaction as possible. It is not essential, however. Generally, the weight ratio of diene to acid will vary from about 2:1 to 1:2, although somewhat higher or lower ratios may be employed without substantially modifying the result.

A particular advantage of the process of this invention is that it is not necessary to use an absolutely pure diene. This is important since pure diene is often extremely difficult to obtain. The desired cyclic esters may be prepared from impure mixtures assaying as low as 70% by weight octadiene. It is, of course, preferred to use high quality octadiene.

The alkanoic acid may be anhydrous or may contain varying amounts of water, even up to 15% by weight or more. This is especially convenient since the commercial grades of these acids often contain some water.

The esters and the alcohol produced by the process of this invention are produced as a mixture of cis-trans isomers which can be isolated if desired, for example by chromatography. However, since the desirable odor is a property of the isomeric mixtures, there is no necessity for separation. The mixture can be used either alone or, as is the usual case, in association with various other materials in the compositions mentioned.

The compounds prepared in accordance with this invention may be utilized alone, but are generally employed as olfactory ingredients in perfume compositions. They are mixed with other ingredients in the perfume composition in the usual manner. The amount of each compound which will be effective to produce the desired result depends upon many factors including, for example, the selected compound, the other ingredients present, their amounts and the effects sought. As little as 0.0002% by weight or as much as 12% by weight of the selected compound or compounds of the invention may be employed to impart desirable aroma characteristics to soaps, cosmetics, synthetic detergents, talcum powders or other toilet goods such as shampoos and other products. In the preparation of such products the compounds of the invention are mixed with the other ingredients in a perfume composition and the perfume composition added to the other components in accordance with standard techniques.

The alcohol prepared in accordance with this invention has a minty, camphoraceous, rosemary-like odor. The ketone has been characterized as minty, camphoraceous, cedarleaf and tansy-like. The novel esters have a woody, piney odor. Tha olfactory compounds, if used alone, will impart the aroma described to the product in which they are employed. In perfume compositions the compounds will contribute the desired aroma, but the overall effect of the perfume composition will be the sum of the effects of each ingredient. Thus the alcohol of this invention may be used to alter the odor characteristics of a perfume composition for example by highlighting or moderating the olfactory sensation contributed by another ingredient in the composition.

The term "perfume composition" is used herein in the usual sense to mean a mixture of organic compounds, including for example, alcohols, aldehydes, ketones, esters and, frequently, hydrocarbons which are combined in fixed proportions so that the odors of the individual compounds produce a pleasant fragrance.

The following nonlimiting examples are given by way of illustration only. In the examples the "soap base" and "soap chips" used are unperfumed sodium based toilet soaps made from tallow and coconut oil. The detergent powder is a powder obtained from Lever Bros. Co., and sold under the trademark Rinso. The liquid detergent is a product manufactured by Ultra Chemical Co., known as P-87 liquid detergent.

EXAMPLE I

To a mixture of 2900 g. of 5,7-dimethyl-1,6-octadiene (84%) and 2100 g. of 90% formic acid was added 264 g. of $BF_3$-etherate over a period of thirty minutes. The mixture was stirred at 50° C. for five hours. After cooling 150 g. of sodium acetate was added and the mixture stirred for ten minutes. After separation, the lower (acid) layer was diluted with an equal volume of water and extracted with benzene. After stripping off the benzene the residue was combined with the original oil layer. The combined crude product weighed 3804 g. and contained 49.8% formate ester (49% conversion).

One-third (1291 g.) of the above crude ester was rushed-over to give 882 g. of distilled material testing 65.9% ester. Fractionation of the distilled ester yielded 3,3,5-trimethyl cycloheptyl formate (mixture of two isomers). $n_D^{20}$ 1.4490, $D_{20}$ 0.9417, B.P. 80° C./55 mm.

EXAMPLE II

Two-thirds of the crude ester (2540 g. from Example 1) was washed once with water and then saponified by refluxing with 1560 g. of methyl alcohol, 624 g. of 50% sodium hydroxide and 180 cc. of water for 1.5 hours. After workup, the crude alcohol weighed 1590 g. and tested 68.7% (46.5% conversion based on diene). Rush-over of 779 g. of the crude alcohol yielded 565 g. of distilled product testing 81.5% (42% conversion based on diene). Fractionation of the distilled alcohol yielded 3,3,5-trimethyl cycloheptanol (mixture of isomers). $n_D^{20}$ 1.4632, $D_{20}$ 0.9044, B.P. 90° C./9 mm.

EXAMPLE III

To 545 g. of rushed-over alcohol (as prepared in Example II) was added a solution of 432 g. chromic acid, 432 g. glacial acetic acid and 432 g. of water at 30° C. The reaction mixture was stirred for three hours at 30° C, then 600 ml. of water was added and the mixture was steam distilled. After separation of the distillate, there was obtained 421 g. of oil testing 85.8% ketone. Fractionation yielded 3,3,5-trimethyl cycloheptanone. The identity of the product was established by infrared analysis. The IR curve was identical with that of an authentic sample of 3,3,5-trimethyl cycloheptanone. B.P. 90° C./15 mm. $n_D^{20}$ 1.4576, $D_{20}$ 0.9104, semicarbazone M.P. 196–198° C.

EXAMPLE IV

A mixture of 80 g. of 5,7-dimethyl-1,6-octadiene, 100 g. of 90% formic acid and 10 g. Amberlyst Resin No. 15, a sulfonated polysytrene resin (Rohm & Haas) was refluxed for three hours. After filtering the catalyst, the acid layer was diluted with an equal volume of water and extracted with benzene. The combined oil layers washed with water and the solvents stripped off. The residue weighed 65. g. and tested 70% as the formate ester of 3,3,5-trimethyl cycloheptanol.

EXAMPLE V

A mixture of 80 g. of 5,7-dimethyl-1,6-octadiene, 90 g. glacial acetic acid, 10 g. water and 15 g. concentrated sulfuric acid was refluxed for three hours. After workup as in Example I, the crude product weighed 69 g. and tested 52% as 3,3,5-trimethyl cycloheptyl acetate. The crude produce was purified by fractional distillation. Its identity was established by comparison with an authentic sample prepared as in Example VII.

EXAMPLE VI

A mixture of 80 g. of 5,7-dimethyl-1,6-octadiene, 53 g. isobutyric acid and 5 g. concentrated sulfuric acid was stirred at 70° C. for eight hours. The catalyst was neutralized and the excess isobutyric acid distilled off. To the residue was added an equal volume of water. After separation of the oil layer, the aqueous layer was extracted with benzene. The combined organic layers washed neutral with water, bicarbonate and water and the solvent stripped off. The residue was rushed-over to yield 27 g. of distillate testing 90% as 3,3,5-trimethyl cycloheptyl isobutyrate which was further purified by fractional distillation.

EXAMPLE VII

A mixture of 86 g. of acetic anhydride and 100 g. of 3,3,5-trimethyl cycloheptanol (mixture of two isomers) was refluxed for five hours. After cooling, benzene was added and the crude ester washed neutral with water and bicarbonate solution and the solvent stripped off. Fractionation yield 3,3,5-trimethyl cycloheptyl acetate (mixture of two isomers). B.P. 85/5 mm., $n_D^{20}$ 1.4475, $D_{20}$ 0.9351.

EXAMPLE VIII

A mixture of 40 g. of 5,7-dimethyl-1,6-octadiene (91%) and 24 g. of 99% formic acid in a 100-ml. round-bottom flask equipped with therometer, stirrer, reflux condenser and drying tube is refluxed for five hours. The bottom layer is separated. A total of 50 ml. of benzene is added to the top layer which is then washed twice with water. The benezene is then removed at reduced pressure to leave 3,3,5-trimethyl cycloheptyl formate as a residue.

EXAMPLE IX

To a mixture of 80 g. of 15 g. of 85% phosphoric acid and 100 g. of 90% formic acid in a round-bottom flask equipped with a stirrer, thermometer, condenser, drying tube and dropping funnel there is added 80 g. of 5,7-dimethyl-1,6-octadiene over a period of 15 minutes. The mixture is refluxed for two hours, cooled and diluted with water. The layers are separated, and the water layer extracted with 25 ml. of benzene. The benzene extract is combined with the oil layer and the combined mixture once with one-half volume of water, once with one-half volume of 5% aqueous sodium carbonate and again with an equal volume of water. The benzene is removed at reduced pressure to leave the desired 3,3,5-trimethyl cycloheptyl formate as a residue.

EXAMPLE X

Preparation of soap composition with 3,3,5-trimethyl cycloheptyl formate

A total of 100 grams of soap chips were mixed with one gram of a perfume oil containing 7.5 parts per 100 of 3,3,5-trimethyl cycloheptyl formate. It was pressed into pleasantly scented bars.

EXAMPLE XI

A total of 100 grams of a detergent were mixed with 0.15 gram of a perfume composition containing 7.5 parts per 100 of 3,3,5-trimethyl cycloheptanol until a substantially homogenous pleasantly scented detergent composition was obtained.

EXAMPLE XII

Preparation of cosmetic powder composition containing 3,3,5-trimethyl cycloheptanone A talcum cosmetic powder was prepared by mixing 100 grams of powder with 0.25 gram of 3,3,5-trimethyl-cycloheptanone in a ball mill.

EXAMPLE XIII

A perfume mixture containing 5 parts per 100 of 3,3,5-trimethyl cycloheptyl acetate was utilized in the preparation of soap bars as described in Example X.

EXAMPLE XIV

Liquid detergent containing 3,3,5-trimethyl cycloheptyl isobutyrate

Concentrated liquid detergent samples containing .1% by weight of 3,3,5-trimethyl cycloheptyl isobutyrate were prepared by adding the appropriate quantity of the compound to the liquid detergent.

While the description of this invention has been given in terms of what are presently considered the perferred embodiments, it will be apparent to those skilled in the art that various changes and modifications can be made without departing from the spirit and scope of the invention. It is the intention therefore, that the appended claims cover all such changes and modifications as fall within the spirit and scope of the invention.

What is claimed is:

1. A process which comprises reacting 5,7-dimethyl-1,6-octadiene with a lower alkanoic acid at an elevated temperature of from about 50° C. to about 100° C. for from one to ten hours in the presence of a strong acid catalyst selected from the group consisting of sulfuric acid, boron trifluoride, and boron trifluoride complexes to produce a lower alkanoyl ester of 3,3,5-trimethyl cycloheptanol.

2. A process as in claim 1 wherein the alkanoic acid is selected from the group consisting of formic and acetic acids.

3. A process as in claim 1 including the further step of converting the ester to 3,3,5-trimethyl cycloheptanol by reaction with water in the presence of an alkali metal hydroxide.

References Cited

UNITED STATES PATENTS

| 2,902,510 | 9/1959 | Webb | 260—489 |
| 3,076,022 | 1/1963 | Kitchens | 260—488 |

OTHER REFERENCES

Chem. Abstracts, 62:1577 f (1965).

LORRAINE A. WEINBERGER, Primary Examiner

V. GARNER, Assistant Examiner

U.S. Cl. X.R.

252—108, 522; 260—488, 586, 617; 424—69